Oct. 17, 1950 — M. VOGEL-JORGENSEN — 2,526,519
PREPARATION OF CALCAREOUS CEMENT RAW MATERIAL
Filed Dec. 23, 1947
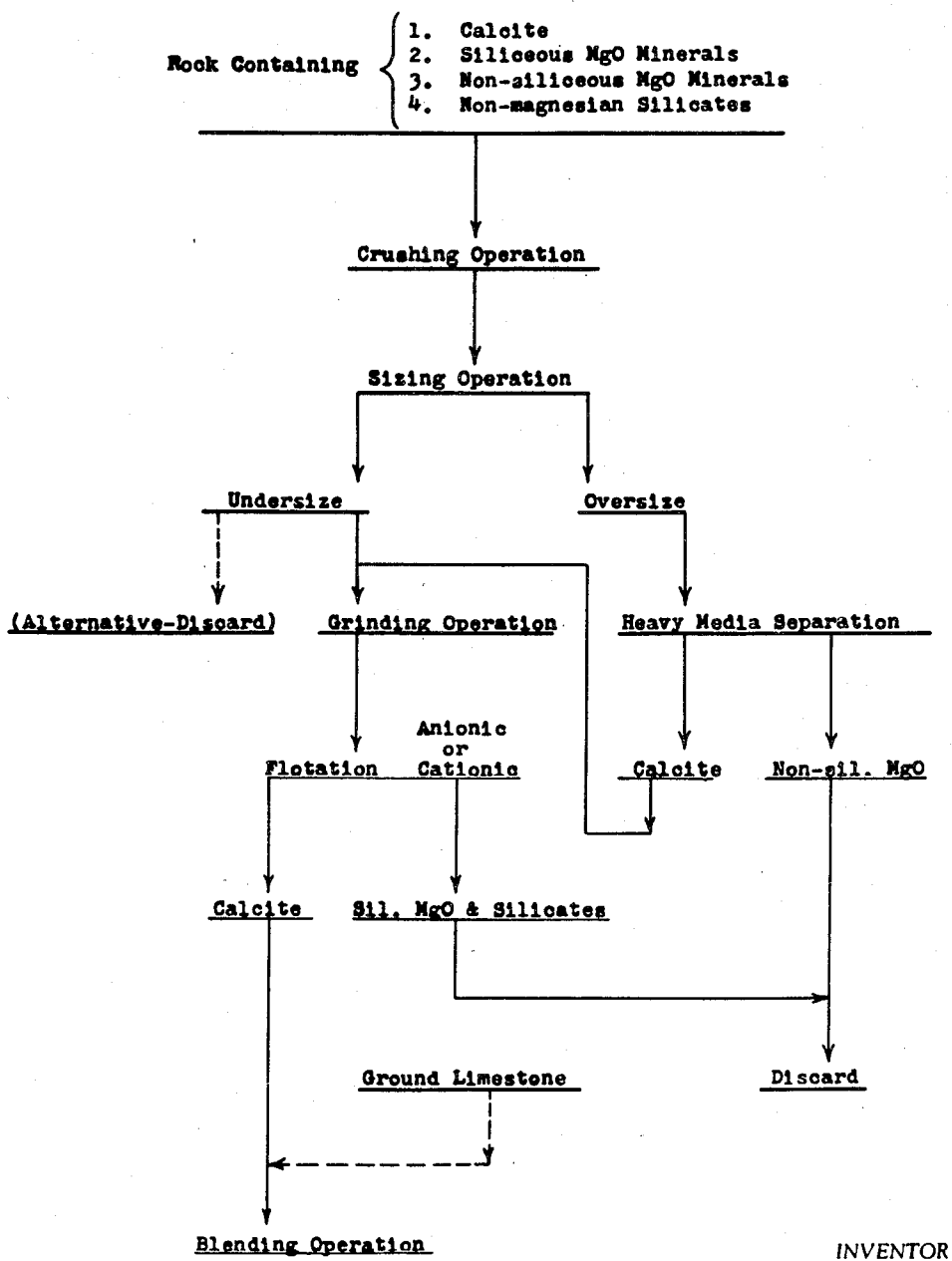
INVENTOR
MIKAEL VOGEL-JORGENSEN
BY
ATTORNEYS

UNITED STATES PATENT OFFICE 2,526,519

PREPARATION OF CALCAREOUS CEMENT RAW MATERIAL

Mikael Vogel-Jorgensen, Copenhagen, Denmark, assignor to Separation Process Company, Catasauqua, Pa., a corporation of Delaware Application December 23, 1947, Serial No. 793,515
In Great Britain December 24, 1946

13 Claims. (Cl. 241—20)

This invention relates to the manufacture of cement and more particularly to the preparation of raw material mixtures suitable for use in the manufacture of Portland cement from calcareous materials which contain excessive proportions of magnesia (MgO), and in many instances also contain undesirably high proportions of siliceous components. The invention provides a method of beneficiating a naturally occurring limestone to product a material of reduced MgO content which may be utilized as the ultimate raw material mixture in a cement burning process, the major proportion of the mixture, or the lime-bearing component of the mixture. In the process of the invention the steps of crushing when required, heavy-media separation, grinding and froth flotation are employed in combination to reduce the magnesia content to a value such that in making a cement of predetermined compound composition therefrom, the magnesia content of the cement will be within the limits of tolerance consistent with a product having desirable hydraulic properties i. e. below 5% and preferably not over about 4% MgO.

These are many limestone deposits which by reason of their geographical location and magnitude could be used to advantage in the manufacture of cement, were it not for their high magnesia content. Several methods have heretofore been proposed for reducing the MgO in such limestones, but none have thus far been completely satisfactory on a commercial scale. As a result, the exploitation of raw material deposits of the referred to type has been negligible.

Magnesia commonly occurs in limestone in the form of the double carbonate dolomite, $CaCO_3 \cdot MgCO_3$, in which the lime and magnesia components are not separable by physical means. Other forms in which magnesia may occur in limestone in quantities making the rock unsuitable for cement manufacture are magnesite, $MgCO_3$, and brucite, $Mg(OH)_2$. Such naturally occurring calcareous materials also frequently contain undesirable proportions of siliceous minerals making it necessary to upgrade the material with respect to its calcium carbonate content in order to use it as a raw material in cement manufacture. Throughout the specification and claims "silicate" refers to mineral compounds of silicon and aluminum or magnesium such as for example mica or talc.

Magnesia also occurs in combination with limestone in the form of silicates such as mica, serpentine, chlorite, and various pyroxenes. The ratio of magnesia combined as carbonate to that combined as silicate varies considerably. In cases where an undesirable quantity of magnesia is present principally in the form of silicates, a satisfactory magnesia reduction may be attained by froth flotation following grinding of the rock to a degree sufficient to free the mineral bonds. If, however, the greater part of the magnesia is present in the form of carbonate, such a treatment does not produce a differential separation due to the similarity in response to collector reagents between the calcite and the magnesian carbonates. Furthermore if the raw material contains an excessive amount of magnesia in each of the above referred to forms it will be apparent that flotation will not be effective to produce the desired correction.

The process of my invention provides a method of overcoming such difficulties and makes possible the utilization of large deposits of high magnesia limestones heretofore unsuitable for cement manufacture. In the case of a naturally occurring raw material in which an excessive quantity of magnesia is present both in the carbonate and silicate forms, the process is of particular value. It is equally applicable to the beneficiation of rocks which may be undesirably high in dolomite, magnesite, or brucite and also excessively high in siliceous components whether or not such siliceous components contain substantial proportions of magnesia.

The specific gravities of the three oxidized types of magnesia minerals above referred to are: dolomite—2.85; magnesite—3.10; and brucite—3.25. The specific gravity of calcite on the other hand is 2.65–2.70, a value sufficiently low to permit separation from any of the three magnesia minerals by means of a heavy media separation, sometimes referred to as "the sink and float process." In order to permit a separation by such a process the natural rock must be coarse grained in order that the mineral bonds may be broken at a relatively large particle size.

The first step of the process of the invention when the raw rock as delivered from the quarry contains any substantial weight of material above about 1 inch in size, is a relatively coarse crushing operation to liberate physically at least a part of the magnesia containing mineral having a gravity higher than the associated calcite. Since an effective separation is not attained by the heavy media separation method on fine materials, it is desirable, in the event that any substantial proportion of particles below about 3 mm. in size are produced in the crushing operation, to remove such undersize before proceeding with the gravity treatment. The removed fraction is retained for further treatment at a later stage of the process.

The second principal step of the process includes the suspension of the crushed limestone of appropriate size in a heavy media. The particular medium used, whether in the form of a heavy organic liquid or an aqueous suspension of finely divided particles of a high gravity solid is first adjusted so that its gravity will fall between that of calcite and the magnesia containing mineral, or at least not substantially less than that of calcite and not substantially greater than that of the magnesia mineral. The method of separation and equipment necessary are known to the art and will not require further discussion. The "sink" product containing an increased proportion of the magnesia is rejected.

The third principal step in the process involves grinding of the "float" product following its separation from the heavy medium. The greater part of the silica and silicates present in the original rock will be present in this fraction due to the weight relationship between the sink and float products, the fine particle size distribution in the calcite, and the closeness in the gravity of these materials to that of calcite. The fineness of the product resulting from the grinding operation will be regulated by the requirements of the succeeding flotation operation. The grinding must in any event be appropriate to liberate physically a proportion of the non-calcareous or siliceous particles at least equal to the undesired proportion. In cases where a fine fraction was removed following the preliminary crushing operation, this undersize may with advantage be returned to the circuit prior to the just described grinding and thus join the partially improved lime product for flotation treatment.

The fourth principal step in the process is froth flotation. Any appropriate method may be used which will reject the undesired proportion of magnesia present in the form of silicates and the undesired proportion of siliceous material. In some cases it will be desirable to carry out an anionic flotation treatment using long-chain fatty acids or alkali metal soaps thereof together with appropriate frothers. In other cases it will be more desirable to float the undesired siliceous material by means of cationic reagents, such as cationic amines. Whichever method is used the product will be a calcareous material of improved grade which will comprise at least the major proportion of the desired raw material mixture of predetermined composition.

As previously stated the product of the just described process will not necessarily constitute a proper mixture to be fed directly to the kiln. In some cases the properties of the natural rock will make it possible to achieve economies in plant operation by producing an improved material sufficiently low in magnesia and siliceous compounds to permit its blending with substantial quantities of ground but otherwise untreated raw rock. In other cases, due to deficiencies in the natural rock, the ratio of silica to iron and alumina in the product of my process will not be appropriate to produce a cement of the desired compound composition. In such a case it is necessary to blend with the beneficiated product an additional material such as clay, shale, sand or iron ore to correct the deficiency.

The following example will illustrate the process of the invention:

The material to be treated was a calcareous rock unsuitable for the production of Portland cement due to the presence of an excessive proportion of magnesia (MgO) both in the form of dolomite and a magnesia containing silicate. An analysis of the raw material showed the presence of 75% $CaCO_3$ and 6% MgO, the latter being distributed as 4.5% in the form of carbonate and 1.5% as silicate. The limestone was crushed to a maximum size of about 1 inch as a result of which the carbonate mineral bonds were reasonably well broken. The silicates remained distributed in the individual particles.

By means of a vibrating screen the fraction of the crushed material passing approximately 6 mesh (3 mm.), was removed and segregated for later blending. This fine fraction on which an efficient separation by heavy media treatment could not be obtained, amounted to 20% by weight of the feed and was of the same chemical composition.

The carbonate separation was carried out in the presence of a heavy media liquid. This was prepared by properly proportioning tetra-bromoethane and carbon tetrachloride to produce a specific gravity of 2.78. The "float" product from this operation was 58% by weight of the original limestone, and had a specific gravity less than 2.8. The $CaCO_3$ content was 77.5% and the MgO was 2.98%.

The "sink" product or heavy material amounted to 22% of the original limestone and contained 50% $CaCO_3$ and 14% MgO. This fraction was rejected.

The separated fine fraction was combined with the above "float" product to give a mixture containing 76.5% $CaCO_3$ and 3.7% MgO. The MgO distribution was 2.0% as carbonate and 1.7% as silicate. This mixed product which amounted to 78% of the original rock was then ground to pass 65 mesh (0.2 mm.).

The —65 mesh ground mixture was subjected to froth flotation in the presence of a fatty acid collecting agent to produce a concentrate amounting to 68% by weight of the original raw material. The grade of this product was 84.5% with respect to $CaCO_3$ content, and contained 2.5% MgO the latter being distributed in the form of 1.9% carbonate and 0.6% silicate. The reject from the flotation was 10% by weight on the original limestone and contained 15% MgO and 15% $CaCO_3$.

It will be noted that the flotation concentrate thus produced is of an appropriate composition for blending with an argillaceous material to provide the necessary ratios of components for a satisfactory kiln feed in the manufacture of Portland cement. In this particular instance the 68% weight of concentrate was blended with a clay corresponding to 10% by weight of the original limestone. This clay contained 6% $CaCO_3$ and 2.3% MgO and after blending the raw material mixture contained 75% $CaCO_3$ and 2.5% MgO. After burning, the resulting cement which had excellent physical properties contained 4% MgO, a figure sufficiently low to meet specifications.

A method of preparing a calcareous cement raw material as described above is represented on the accompanying flow sheet.

As an alternative to the above described method of gravity separation in the first stage of the process, a method which is more economical in commercial scale operation may be used. In such an alternative the heavy media is an aqueous suspension of finely ground ferro-silicon or magnetite or a mixture of the two so proportioned as to give a media having a gravity of 2.8.

I claim:

1. A method for preparing a calcareous cement raw material from a limestone containing an excessive proportion of magnesia distributed between an oxidized non-siliceous mineral and a silicate mineral which comprises crushing the limestone material to a degree sufficient to liberate physically at least a part of the magnesian non-siliceous mineral, separating any particles finer than a predetermined size from the crushed material, subjecting the remainder of the crushed material to a gravity separation while suspended in a heavy media having a gravity intermediate the gravities of calcite and said magnesian non-siliceous mineral, separating the fraction having an increased magnesia content, grinding the other fraction to a degree sufficient to liberate physically a proportion of the magnesian silicate mineral particles, subjecting a slurry of the material so ground to froth flotation to separate physically liberated magnesian silicate mineral and to produce a calcareous material of reduced magnesia content.

2. A method for preparing a calcareous cement raw material as set forth in claim 1 in which the froth flotation is conducted in the presence of an anionic collector of the class consisting of long-chain fatty acids and alkali metal soaps of such fatty acids, whereby the calcareous material of reduced magnesia content is floated.

3. A method for preparing a calcareous cement raw material as set forth in claim 1 in which the froth flotation is conducted in the presence of a cationic amine collector, whereby physically liberated magnesian silicate mineral is floated.

4. A method for preparing a calcareous cement raw material from a limestone containing an excessive proportion of a siliceous material from the class consisting of silica and non-magnesian silicates and an excessive proportion of magnesia distributed between an oxidized non-siliceous mineral and a silicate mineral which comprises crushing the limestone material to a degree sufficient to liberate physically at least a part of the magnesian non-siliceous mineral, separating any particles finer than a predetermined size from the crushed material, subjecting the remaining crushed material to a gravity separation while suspended in a heavy media having a gravity intermediate the gravities of calcite and the magnesian non-siliceous mineral, separating the fraction of increased magnesian non-siliceous mineral content, grinding the other fraction to a degree sufficient to physically liberate particles of the magnesian silicate mineral and of siliceous material of said class, subjecting a slurry of the material so ground to froth flotation to separate physically liberated particles of magnesian silicate mineral and siliceous material of said class and to produce a calcareous material containing less magnesia and less siliceous material of said class than the original limestone.

5. A method for preparing a calcareous cement raw material as set forth in claim 4 in which the froth flotation is conducted in the presence of an anionic collector of the class consisting of long-chain fatty acids and alkali metal soaps of such fatty acids whereby the calcareous material is floated with the magnesian silicate mineral and the siliceous material of said class remaining in the tails.

6. A method for preparing a calcareous cement raw material as set forth in claim 4 in which the froth flotation is conducted in the presence of a cationic amine collector, whereby the magnesian silicate mineral and siliceous material of said class are floated and the calcite remains in the tails.

7. A method for preparing a calcareous cement raw material as set forth in claim 1 in which the calcareous material of reduced magnesia content is blended with ground raw limestone to produce a mixture suitable for use in the production of cement of predetermined analysis.

8. A method for preparing a calcareous cement raw material as set forth in claim 1 in which the magnesian non-siliceous mineral contained in the limestone is in the form of a carbonate.

9. A method for preparing a calcareous cement raw material as set forth in claim 1 in which the separated finer particles of the crushing are of a size less than about 3 mm.

10. A method for preparing a calcareous cement raw material as set forth in claim 1 in which the heavy media is an aqueous suspension of finely-divided, high-specific-gravity mineral particles.

11. A method for preparing a cement raw material mixture of predetermined analysis from a limestone containing an excessive proportion of magnesia distributed between an oxidized non-siliceous mineral and a silicate mineral, which comprises crushing the limestone material to a degree sufficient to liberate physically at least a part of the magnesian non-siliceous mineral, separating particles finer than a predetermined size from the crushed material, subjecting the oversize material to a gravity separation while suspended in a heavy media having a gravity intermediate the gravities of the calcite and the said magnesian non-siliceous mineral, separating and discarding the fraction having an increased magnesia content, returning the undersize separated from the crushed material to the improved limestone product following its separation from the medium, grinding this mixture to a degree sufficient to liberate physically a proportion of the magnesian silicate mineral particles at least equal to the undesired proportion, subjecting a slurry of the material so ground to froth flotation to separate the undesired proportion of magnesian silicate mineral and to produce a calcareous material which will comprise at least the major proportion of the desired raw material mixture of predetermined analysis.

12. A method for preparing a cement raw material mixture of predetermined analysis as set forth in claim 11 in which a high grade limestone froth having a reduced magnesium silicate content is produced and separated during the flotation operation, the principal reagent used being an anionic collector of the class consisting of long chain fatty acids and alkali metal soaps of such fatty acids.

13. A method for preparing a cement raw material mixture of predetermined analysis as set forth in claim 11 in which a froth containing the undesired proportion of magnesium silicate mineral is produced and separated during the flotation operation, the principal flotation reagent used being a cationic amine collector.

MIKAEL VOGEL-JORGENSEN.

REFERENCES CITED

The following references are of record in the file of this patent:

UNITED STATES PATENTS

| Number | Name | Date |
| --- | --- | --- |
| 2,385,079 | Hedley | Sept. 19, 1945 |

FOREIGN PATENTS

| Number | Country | Date |
| --- | --- | --- |
| 864,877 | France | Feb. 3, 1941 |